United States Patent Office 2,898,289
Patented Aug. 4, 1959

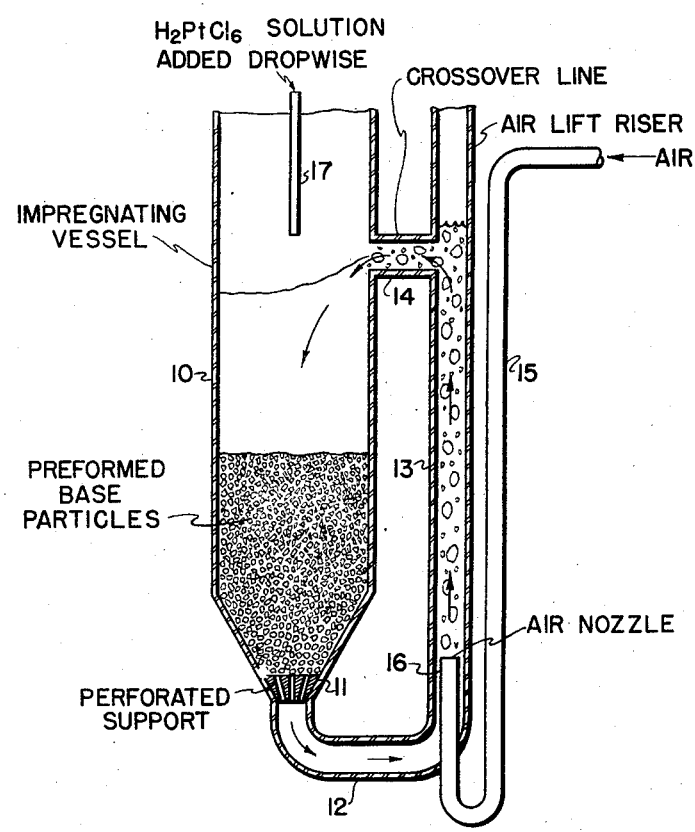

2,898,289

PREPARATION OF CATALYST PARTICLES

Charles Newton Kimberlin, Jr., and Fred J. Buchmann, Baton Rouge, La., assignors to Esso Research and Engineering Company, a corporation of Delaware Application December 1, 1954, Serial No. 472,342

16 Claims. (Cl. 208—134)

The present invention relates to the preparation of catalysts and more particularly to the preparation of platinum group metal catalysts having exceptionally high activity and selectivity in the hydroforming of hydrocarbons boiling in the motor fuel or naphtha range.

Catalysts containing platinum group metals and methods of preparing such catalysts for use in a variety of industrial chemical processes have been described in patents and technical publications for many years. A very considerable amount of interest and activity has been shown in the last five to ten years in the preparation and use of platinum-containing catalysts for use in the hydroforming of naphtha or motor gasoline boiling range hydrocarbons. This field has been and is currently the subject of intensive investigation by a number of groups in an effort to find new catalysts or new methods for preparing catalysts which will have high activity, permitting the charging of large amounts of naphtha feed for a given volume or weight of catalyst or high selectivity, giving high yields of high octane number products. Obviously a catalyst having both high activity and high selectivity is much to be desired.

Many procedures for the preparation of platinum group metal catalysts have been described involving, for example, composing or impregnating the support material with a platinum group metal compound and treating with a reducing agent or with hydrogen sulfide or other precipitant or impregnation of the support in powder or shaped (pilled or extruded) form, drying, and calcining.

It is the object of this invention to provide an improved method for preparing shaped platinum group metal catalysts.

It is also the object of this invention to provide an improved method for preparing pilled or extruded platinum group metal catalysts of improved activity for use in the hydroforming of motor gasoline boiling range fractions.

These and other objects will appear more clearly from the detailed specification and claims which follow.

Briefly, the present invention involves shaping the carrier material into the physical form desired in the final catalyst as by spray drying or suspending alumina gel forming materials in a water-immiscible medium and maintaining the particles in suspension until they have set to gel form or by extruding or pelleting the support material with or without aids, and, if the support material is not already adsorptive, heating or calcining sufficiently to develop the high surface area and pore diameter and pore volume characteristics necessary to impart adsorptive properties in the support material. The shaped, adsorptive carrier materials or preformed base particles are wet with water and immersed in water in a vessel which will allow rapid and thorough circulation of the aqueous medium. The preformed base particles are preferably supported in the vessel upon a perforated plate or screen which allows free flow of liquid but holds back the support particles. The water is then caused to circulate through the preformed base particles while a solution of a platinum group metal compound is slowly added to the water. In a preferred embodiment, an adsorption modifier may be added to the water prior to or simultaneously with the platinum group metal compound solution in order to insure the homogeneous distribution of the said compound upon the base particles. The impregnation may be conducted to obtain uniform concentrations of platinum group metal throughout the base particles or a definite concentration gradient from the surface inwardly of each of the particles. Circulation of the aqueous medium is continued for about an hour after the addition of the platinum group metal has been completed. In a preferred embodiment an air lift riser or pump is used to circulate the solution through the preformed base particles. This is believed to be especially advantageous since this will thoroughly aerate the impregnating solution and thus exert a beneficial oxidizing action.

Reference is made to the accompanying drawing illustrating the preferred method of impregnating the preformed base particles.

In the drawing, 10 is the impregnating vessel, which is provided at its bottom with a screen or perforated plate 11 for supporting the base particles undergoing impregnation. The base of the vessel 10 is attached via connector line 12 to the bottom of air lift riser line 13. A cross-over line 14 connects the upper part of the air lift riser line with the upper part of the impregnating vessel. Air, preferably filtered to avoid the introduction of contaminants, is supplied through line 15 to nozzle 16 in the lower part of riser line 13. Water is supplied to the vessel 10 and the preformed base particles, pills, or extruded, are submerged in the water, the amount of water and the charge of solid particles being properly calculated so that the water level is sufficiently high to permit circulation through the cross-over line 14. The introduction of air into the riser line 13 through nozzle 16 at a sufficiently rapid rate will cause rapid circulation of the water or water containing the impregnating solution from the bottom of vessel 10 into the riser line 13 and passes into the upper part of the vessel 10 through cross-over line 14. By adding the metal compound solution to the surface of the liquid in vessel 10 through inlet line or nozzle 17 it is thoroughly and rapidly mixed with the water and brought into uniform contact with the base particles to be impregnated. Use of the air lift is desirable, since it thoroughly aerates the impregnating solution exerting an oxidizing action thereon.

The catalyst support material used in accordance with the present invention consists essentially of alumina, and while alumina from any source may be used, it is preferred to use an alumina of a high degree of purity as is obtained from aluminum alcoholate as described in U.S. Patent No. 2,636,865. It is further preferred that the alumina be of the gel type such as that produced by drying an alumina hydrosol which may be obtained by hydrolysis of aluminum alcoholate to which a peptizing agent such as acetic acid has been added as described in U.S. Patent No. 2,656,321. Other forms of adsorptive or activated alumina such as gamma alumina derived from Boehmite or alpha alumina monohydrate or eta alumina derived from beta alumina trihydrate as well as from precipitated hydrous alumina may be used. The alumina may, if desired, contain small stabilizing amounts (less than 5 weight percent) of silica.

The catalyst support material, before or after, preferably before, being rendered adsorptive, is preformed or shaped to the physical form desired for the final catalyst by any of the well-known methods such as spray drying, setting to spherical form while suspended in an immescible fluid, or by pilling or extrusion with or without the aid of a lubricant or pilling aid. The preformed base particles are generally less than ¼ inch in diameter and preferably are about ⅟₁₆ to ⅜₆ inch in diameter. If the alumina has not been calcined prior to pilling or preforming, it is desirable to calcine the preformed particles, generally at temperatures of about 600° F. to 1200° F., to render them adsorptive before impregnation in accordance with this invention.

The adsorptive alumina preformed particles are thoroughly wetted with water preparatory to effecting the impregnation and may, if desired, be dropped into the liquid in the impregnating vessel in such a way as to avoid entrapment of air in the bed of preformed base or support particles. If air entrapment appears to be a problem, complete removal of the air can be insured by lowering the pressure on the liquid in the impregnating vessel substantially below atmospheric pressure one or more times.

Maximum dispersion of the platinum compound in the preformed support particles can be facilitated by the addition of adsorption modifiers to the impregnating liquid. Suitable materials for this purpose include trichloroacetic acid, nitric acid, acetic acid, aqua regia, hydrochloric acid, aluminum chloride, aluminum nitrate, ammonium chloride, ammonium nitrate, phenols, substituted phenols, chlorhydrin and sulfonic acids. Elemental or gaseous chlorine is a preferred material for this purpose. In general, suitable adsorption modifiers are materials which compete with the platinum compound for adsorption sites on the alumina and which do not exert a poisoning or detrimental effect upon the catalytic properties of the platinum. The amount of adsorption modifier employed may be in the range of 0.1 to 10, preferably 0.2 to 2 parts by weight per 100 parts by weight of alumina.

The impregnating solution is formed by adding a stock solution of platinum group metal compound, preferably of a concentration range of about 0.1% to 10% platinum as metal, to the impregnation vessel in which the preformed alumina support is covered by the circulating stream of water. The concentration of the impregnating solution which is in actual contact with the preformed alumina support may be in the range of about 0.005% to 0.25%, preferably 0.01% to 0.1%, platinum as metal. The total amount of platinum metal compound solution added should be sufficient to deposit 0.05 to 2.0 weight percent of the metal upon the preformed support.

The temperature of the solution during impregnation may be from about 60° F. to 200° F., preferably about 70° F. to 120° F. The addition of the platinum compound should be made slowly, preferably during the course of from ½ hour to 2 hours, or perhaps even longer in the case of high platinum content catalysts. After addition of the platinum compound has been completed, the circulation of the solution over the catalyst particles is continued for an hour or more. Excess liquid, which is now devoid of platinum, is then drained from the impregnated bodies and the latter are removed from the impregnating vessel through a suitable outlet or discharge opening, not shown, dried at 200° F. to 300° F., and, if desired, calcined at temperatures of 600°–1000° F. for from about 1 to 8 hours.

When employing preformed alumina bases which are sufficiently adsorptive to produce highly active catalysts, the adsorption of the platinum group metal compound from the impregnating solution is both rapid and complete. The rate of circulation of the impregnating solution through the bed of preformed alumina support may be in the range of about 0.5 to 10 volumes, preferably more than 2 volumes of impregnation solution per volume of preformed support per minute. The platinum group metal compound used for impregnation preferably comprises chloroplatinic acid.

Compositions prepared in accordance with the above procedure are useful as catalysts in the hydrogenation, dehydrogenation, reforming, hydrodesulfurization, hydrocracking, and other conversions of hydrocarbons. They are especially valuable as catalysts for the hydroforming of naphtha or motor gasoline fractions at pressures above about 200 pounds per square inch, at temperatures of about 800°–975° F., and in the presence of hydrogen or hydrogen-rich recycle gas supplied in amounts of from about 2000 to 8000 cubic feet per barrel of naphtha feed.

The following examples are illustrative of the present invention.

Example I

Aluminum alcoholate solution was prepared by the procedure described in U.S. Patent No. 2,636,865. Aluminum metal cubes about ½ inch in size were dissolved in a 50/50 mixture of mixed amyl alcohols and petroleum naphtha boiling in the range of 230°–350° F. About 0.001 part by weight of mercuric chloride per part by weight of aluminum metal was used to promote the reaction between the aluminum metal and the alcohol. To initiate the reaction between the metal and the alcohol it was necessary to heat the mixture to about 220° F., but thereafter cooling was necessary to remove the heat of reaction. A total of 27 grams of aluminum metal was dissolved in each liter of amyl alcohol-hydrocarbon mixture. Alumina hydrosol was prepared from aluminum alcoholate solution according to the method of U.S. Patent No. 2,656,321. Glacial acetic acid was added to the aluminum alcoholate solution in the ratio of about 7.5 cc. of acetic acid per liter of alcoholate solution, and the mixture was thereafter immediately hydrolyzed by rapidly mixing with twice its volume of water that had been heated to about 180° F. The mixture was allowed to settle for about an hour and the separated layer of hydrocarbon and regenerated alcohol was removed by decantation. The remaining alcohol and hydrocarbon was removed from the hydrosol by distillation. The resulting alumina hydrosol comprised about 3% alumina. Alumina gel was prepared by drying alumina hydrosol in an oven heated at about 250° F. The resulting alumina gel contained about 30% volatile matter (water plus acetic acid) and comprised a hydrated form of alumina. Alumina gel was ground to pass a 20 mesh screen and mixed with water in the ratio of about 110 parts by weight of water to 100 parts by weight of the oven dried alumina gel. The mixture was extruded by forcing it through a ⅟₁₆ inch diameter circular die by means of a piston. A pressure of about 16,000 pounds per square inch was required to force the moist alumina gel through the ⅟₁₆ inch die. The extruded alumina gel was dried at about 250° F. and broken into pellets having a length of about ⅛ to ⅜ inch. Th extruded pellets were activated by calcining about six hours at 1050° F. The calcined pellets were placed in an impregnation vessel provided with means for circulating impregnating solution through an air lift. The pellets were covered with water, circulation through the air lift was commenced, and a solution of chloroplatinic acid containing 10% by weight of platinum metal was added during the course of one-half hour. The amount of chloroplatinic acid added was sufficient to deposit 0.6 weight percent platinum metal on the extruded pellets. The circulation was continued for an additional one-half hour after addition of the platinum solution was completed. The water was drained from the impregnation vessel and the impregnated pellets were dried at 250° F. and activated by calcining for four hours at 1000° F. This catalyst is designated catalyst A. Catalyst A had an average crushing strength (side) of 16 pounds. The distribution of the platinum in catalyst A was determined by examining the ends of broken pellets under a low power microscope after first reducing the platinum to the metallic form to make it visible. The reduction was accomplished by treating a portion of the catalyst with hydrogen gas for one-half hour at 832° F. It was observed that catalyst A contained an inner core of alumina on which no platinum was deposited. The diameter of this inner core was about one-fifth the diameter of the entire pellet. The concentration of the platinum was greatest at the external surface of the pellet and diminished progressively toward the inner core.

To illustrate the advantages of catalysts prepared according to the present invention as described in Example I, several catalysts will be described having the same composition as catalyst A and prepared from the same starting materials, but prepared by various prior art methods.

*Example II*

Alumina gel was prepared by drying alumina hydrosol at about 250° F. as described in Example I. The alumina gel was ground to pass a 20 mesh sieve and calcined about six hours at 1050° F. The calcined gel was impregnated by rapidly mixing with a solution of chloroplatinic acid containing sufficient chloroplatinic acid to deposit 0.6 weight percent platinum metal on the alumina. The volume of solution used was just enough to thoroughly wet the alumina gel. The impregnated gel was dried at about 250° F. An attempt was made to extrude the impregnated gel by adding water and forcing it through a die; however, this was found to be impossible, since the material could not be forced through the die. Since this catalyst could not be extruded, it was formed into 3/16 inch by 3/16 inch pellets by a pilling operation wherein the dry powder was compressed in a die by a punch. The pilled catalyst was activated by calcining four hours at 1000° F. This catalyst is designated catalyst B. Catalyst B had a crushing strength (side) of about 10 pounds average. The platinum distribution in catalyst B was homogeneous.

*Example III*

Aluminum alcoholate solution, prepared as described in Example I, was hydrolyzed by adding it with stirring to twice its volume of water at 80° F. After settling for about one hour the organic layer was decanted and the resulting slurry of alumina was dried in an oven at about 250° F. The resulting dry alumina comprised about 80% alumina beta trihydrate and about 20% alumina alpha monohydrate. The dried alumina was ground to pass 20 mesh and calcined six hours at 1050° F. The calcined alumina was impregnated by rapid mixing with a solution of chloroplatinic acid containing sufficient chloroplatinic acid to deposit 0.6 weight percent platinum metal on the alumina. The volume of the chloroplatinic acid solution was just sufficient to thoroughly wet the alumina. The impregnated alumina was dried at 250° F. A portion of the dried impregnated catalyst was formed into 3/16 inch by 3/16 inch pellets by pilling. The pilled catalyst was activated by calcining four hours at 1000° F. This catalyst is designated catalyst C. The remainder of the dried impregnated catalyst was formed into 1/16 inch diameter pellets 1/8 to 3/8 inch long by extrusion. Extrusion of this catalyst was very difficult. The extruded catalyst was activated by calcining four hours at 1000° F. This catalyst is designated catalyst D. The crushing strength (side) of catalyst C was about 8 pounds average. The crushing strength (side) of catalyst D was only two pounds average. The distribution of platinum in catalysts C and D was homogeneous.

Catalysts A, B, C, and D were employed for the hydroforming of a 220°–325° F. boiling range virgin naphtha having a clear octane number of 49 CFR–R obtained from South Louisiana crudes. The hydroforming conditions were 900° F. catalyst temperature, and 200 p.s.i.g. pressure, with 5000 standard cubic feet of added hydrogen per barrel of naphtha feed. The naphtha feed rate was adjusted to produce a $C_{5+}$ product having a clear octane number of 95 CFR–R. The data obtained on the various catalysts are compared in the following table:

| Catalyst | Crushing Strength, Pounds | W./Hr./W.[1] for 95 Oct. No. | Yield, Volume Percent $C_{5+}$ at 95 Oct. No. |
|---|---|---|---|
| A | 16 | 3.5 | 85 |
| B | 10 | 1.9 | 82 |
| C | 8 | 2.7 | 85 |
| D | 2 | 2.7 | 85 |

[1] Feed rate, weight of naphtha per hour per weight of catalyst.

The above data clearly show the superiority of catalyst A with respect to pill strength and activity. The selectivity of catalyst A, as shown by the yield of $C_{5+}$ at 95 octane number, is also equivalent to the best of the prior art catalysts.

*Example IV*

An alumina hydrosol was prepared from aluminum alcoholate solution as described in Example I. The hydrosol was impregnated by adding with stirring a solution of chloroplatinic acid having a concentration of 10 weight percent platinum as metal. The chloroplatinic acid was added dropwise over a period of one-half hour. The amount of chloroplatinic acid solution was sufficient to deposit 0.6 weight percent platinum metal on the alumina. The impregnated hydrosol was dried in an oven at 250° F., ground to pass a 20 mesh screen, mixed with water, and extruded through a 1/16 inch circular die. The extruded catalyst was dried at 250° F., broken into 1/8 to 3/8 inch length, and activated by calcining four hours at 1000° F. This catalyst is designated catalyst E. Catalyst E had a crushing strength (side) of 16 pounds. The distribution of platinum in catalyst E was homogeneous.

The activities of catalysts A and E were compared in a screening test. In this test naphtha feed mixed with hydrogen (9000 s.c.f. $H_2$/bbl. of naphtha) is passed over the catalyst at 832° F. at atmospheric pressure at a constant feed rate for a period of 15 minutes. The product is stabilized at 80° F., and evaluated by means of its refractive index. The severity of the test, that is, the weight of oil per weight of catalyst, is varied by changing the amount of the catalyst charge. The relative activity of a catalyst is then inversely proportional to the weight of catalyst charge required to produce a given increase in the refractive index of the naphtha. The test results are expressed as relative activity as compared to the activity of a standard reference catalyst. The reference catalyst was arbitrarily assigned a relative activity rating of 100. The following results were obtained:

Catalyst: Relative activity
A ------------------------------------------- 170
E ------------------------------------------- 90

The above data clearly show the superior activity of catalyst A.

The foregoing description contains a limited number of embodiments of the present invention. It will be understood that this invention is not limited thereto, since numerous variations are possible without departing from the scope thereof.

What is claimed is:

1. A method of preparing improved platinum on alumina catalysts which comprises submerging preformed bodies of adsorptive alumina in a large quantity of water, circulating the water through a bed of said preformed bodies, slowly adding a solution of a platinum group metal compound to said water in sufficient amount to incorporate the desired amount of platinum metal in the support, continuing the circulation of the solution for a period of at least about one-half hour after addition of the solution of the platinum compound is completed, separating the impregnated, preformed bodies from the liquid, drying and calcining the impregnated bodies.

2. The method as defined in claim 1 in which the circulation of the water containing the solution of the platinum group metal compound is effected by means of an air lift.

3. The method as defined in claim 2 in which the platinum group metal compound is chloroplatinic acid and is supplied in sufficient amount to incorporate 0.05 to 2.0 weight percent of platinum in the alumina support.

4. A method of preparing improved platinum on alumina catalysts which comprises submerging preformed bodies of adsorptive alumina derived from an aluminum alcoholate in a large quantity of water, circulating the water through a bed of said preformed bodies, slowly adding a solution of a platinum group metal compound to said water in sufficient amount to incorporate the desired amount of platinum metal in the support, continuing the circulation of the solution for a period of at least about one-half hour after addition of the solution of the platinum compound is completed, separating the impregnated, preformed bodies from the liquid, drying and calcining the impregnated bodies.

5. A method of preparing improved platinum on alumina catalysts which comprises submerging preformed bodies consisting essentially of adsorptive eta alumina in a large quantity of water, circulating the water through a bed of said preformed bodies, slowly adding a solution of a platinum group metal compound to said water in sufficient amount to incorporate the desired amount of platinum metal in the support, continuing the circulation of the solution for a period of at least about one-half hour after addition of the solution of the platinum compound is completed, separating the impregnated, preformed bodies from the liquid, drying and calcining the impregnated bodies.

6. A hydrocarbon catalyst obtained by submerging preformed bodies of adsorptive alumina in a large quantity of water, circulating the water through a bed of said preformed bodies, slowly adding a solution of a platinum group metal compound to said water in sufficient amount to incorporate the desired amount of platinum metal in the support, continuing the circulation of the solution for a period of at least about one-half hour after addition of the solution of the platinum compound is completed, separating the impregnated, preformed bodies from the liquid, drying and calcining the impregnated bodies.

7. A hydrocarbon catalyst as defined in claim 6 in which the alumina is derived from an aluminum alcoholate.

8. A hydrocarbon catalyst as defined in claim 7 in which the platinum group metal is platinum and is present in amounts of from 0.05 to 2.0 weight percent.

9. A process for hydroforming hydrocarbons which comprises contacting the hydrocarbons in admixture with hydrogen under active conversion conditions with catalysts obtained by submerging preformed bodies of adsorptive alumina in a large quantity of water, circulating the water through a bed of said preformed bodies, slowly adding a solution of a platinum group metal compound to said water in sufficient amount to incorporate the desired amount of platinum metal in the support, continuing the circulation of the solution for a period of at least about one-half hour after addition of the solution of the platinum compound is completed, separating the impregnated, preformed bodies from the liquid, drying and calcining the impregnated bodies.

10. The process as defined in claim 9 in which the alumina of the catalyst support is derived from an aluminum alcoholate.

11. The process as defined in claim 9 in which the platinum group metal is platinum and is present in amounts of from 0.05 to 2.0 weight percent.

12. The process as defined in claim 9 in which the alumina of the catalyst support is derived from an aluminum alcoholate and the platinum group metal is platinum and is present in amounts of from 0.05 to 2.0 weight percent.

13. A method of preparing improved platinum on alumina catalysts which comprises preparing an aluminum alcoholate, hydrolyzing the aluminum alcoholate in the presence of a peptizing agent in order to form an alcoholate alumina hydrosol, drying the alumina hydrosol to form an alumina gel, mixing the alumina gel with water to form an extrudable mixture, extruding the mixture, drying the extruded alumina gel and breaking the dried gel into pellets, calcining the pellets to render the alumina adsorptive, submerging the resultant adsorptive alumina pellets in a large quantity of water, circulating the water through the bed of pellets, slowly adding a solution of a platinum group metal compound to said water in sufficient amount to incorporate the desired amount of platinum into said pellets, continuing the circulation of the solution for a period of at least about one-half hour after the addition of the solution of the platinum compound is completed, separating the impregnated pellets from the liquid, drying and calcining the impregnated pellets.

14. The method as defined in claim 13 in which the platinum group metal compound is chloroplatinic acid and is supplied in sufficient amount to incorporate 0.05 to 2.0 weight percent of platinum in the alumina support.

15. The method as defined in claim 14 in which an adsorption modifier is included in the impregnating solution.

16. The method as defined in claim 15 in which the circulation of the impregnating solution is effected by means of an air lift.

References Cited in the file of this patent

UNITED STATES PATENTS

| | | |
|---|---|---|
| 741,517 | Macalpine | Oct. 13, 1903 |
| 2,475,155 | Rosenblatt | July 5, 1949 |
| 2,533,278 | Milliken et al. | Dec. 12, 1950 |
| 2,567,297 | Milligan et al. | Sept. 11, 1951 |
| 2,606,159 | Owen | Aug. 5, 1952 |
| 2,636,865 | Kimberlin | Apr. 28, 1953 |
| 2,689,226 | Hoekstra | Sept. 14, 1954 |

OTHER REFERENCES

"Catalyst Air Lift System," Resen, Oil and Gas Journal, vol. 50, No. 8, pages 66, 67, 91 and 93; June 28, 1951.